United States Patent [19]
Hamamoto et al.

[11] Patent Number: 6,139,991
[45] Date of Patent: Oct. 31, 2000

[54] ELECTROLYTE SOLUTION FOR LITHIUM SECONDARY BATTERY AND LITHIUM SECONDARY BATTERY USING THE SAME

[75] Inventors: Toshikazu Hamamoto; Atsuo Hitaka; Yukio Nakada; Koji Abe; Tsutomu Takai, all of Ube, Japan

[73] Assignee: Ube Industries, Ltd., Ube, Japan

[21] Appl. No.: 09/137,599

[22] Filed: Aug. 21, 1998

[30] Foreign Application Priority Data

Aug. 22, 1997 [JP] Japan ..................................... 9-226158
Mar. 27, 1998 [JP] Japan .................................. 10-080967

[51] Int. Cl.$^7$ ................................................. H01M 6/18
[52] U.S. Cl. .......................... 429/307; 429/322; 429/323; 429/330; 429/331; 429/332; 429/338; 429/342; 429/223; 429/224; 429/231.1; 429/231.3; 429/231.8; 429/231.95; 252/62.2
[58] Field of Search ..................................... 429/307, 317, 429/322, 330, 331, 332, 223, 224, 231.8, 231.3, 231.95, 323, 338, 342, 231.1; 252/62.2

[56] References Cited

U.S. PATENT DOCUMENTS 5,474,862 12/1995 Okuno et al. ........................... 429/197
5,753,389 5/1998 Gan et al. ................................ 429/197

FOREIGN PATENT DOCUMENTS 63-102166 5/1988 Japan .

*Primary Examiner*—Laura Weiner
*Attorney, Agent, or Firm*—Burgess, Ryan & Wayne

[57] ABSTRACT

An electrolyte solution for a lithium secondary battery comprising a non-aqueous solvent, and an electrolyte and a carbonic ester derivative both dissolved therein, said carbonic ester derivative having the formula (I):

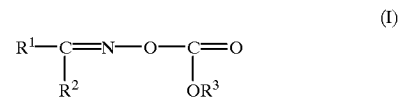

wherein $R^1$, $R^2$ and $R^3$ independently represent an alkyl group having 1 to 12 carbon atoms, a cycloalkyl group having 3 to 6 carbon atoms, or an aryl group having 6 to 12 carbon atoms, provided that $R^2$ may be a hydrogen atom and provided that $R^1$ and $R^2$ may be connected through a methylene group to form a cycloalkyl group having 3 to 6 carbon atoms.

14 Claims, No Drawings

ELECTROLYTE SOLUTION FOR LITHIUM SECONDARY BATTERY AND LITHIUM SECONDARY BATTERY USING THE SAME

BACKGROUND OF THE INVENTION

1. Field of the Invention

The present invention relates to an electrolyte solution capable of providing a lithium secondary battery having excellent cycle characteristics and excellent battery characteristics such as electrical capacity, storage characteristics etc., and an electrolyte thereafter.

2. Description of the Related Art

Lithium secondary batteries are widely used as a driving electric source for small-sized electronic equipment. Lithium secondary batteries are mainly composed of a cathode, a non-aqueous electrolyte solution and an anode. They can use a lithium composite oxide such as $LiCoO_2$ as a cathode and a carbon material or lithium metal as an anode. As an electrolyte for a lithium secondary battery, carbonates such as ethylene carbonate (EC), propylene carbonate (PC) are preferably used.

However, secondary batteries having further improved characteristics such as cycle characteristics and electrical capacity are required.

In the case of a lithium secondary battery using, as an anode, a highly crystallized carbon material such as natural graphite or artificial graphite, peeling off of the carbon material is observed which causes problems, depending upon the degree of the phenomenon thereof, the battery capacity is decreased. The peeling-off of the carbon material is considered to occur due to the decomposition of the solvent in the electrolyte solution during the charge, which is considered to be due to the electrochemical reduction of the solvent at the interface between the carbon material and the electrolyte solution. Among the cyclic carbonate, propylene carbonate (PC) having a low melting point and a high dielectric constant is preferable, as the non-aqueous solvent, due to the high electric conductivity at a low temperature. However, when graphite is used as an anode, the decomposition of PC becomes remarkable, and therefore, PC was not able to be used as an electrolyte for a lithium secondary battery. Further, when ethylene carbonate (EC) is used, a part of EC is decomposed during the repeated charge and discharge cycle to cause decrease in the battery characteristics. Thus, it is the present status that the battery characteristics of the lithium secondary batteries such as the cycle characteristics and the electric capacity are not necessarily satisfied.

SUMMARY OF INVENTION

Accordingly, the objects of the present invention are to solve the above-mentioned problems relating to the electrolyte solution for a lithium secondary battery and to provide an electrolyte solution for a lithium secondary battery capable of forming a lithium secondary battery having excellent cycle characteristics and also having excellent battery characteristics such as the electrical capacity and the storage characteristics under the charged condition and to provide a lithium secondary battery using such an electrolyte solution.

In accordance with the present invention, there is provided an electrolyte solution for a lithium secondary battery comprising a non-aqueous solvent, and an electrolyte and a carbonic ester derivative both dissolved therein, said carbonic ester derivative having the formula (I):

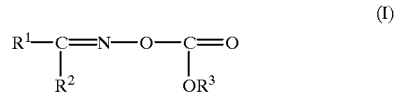

wherein $R^1$, $R^2$ and $R^3$ independently represent an alkyl group having 1 to 12 carbon atoms, a cycloalkyl group having 3 to 6 carbon atoms, or an aryl group having 6 to 12 carbon atoms, provided that $R^2$ may be a hydrogen atom and provided that $R^1$ and $R^2$ may be connected through a methylene group to form a cycloalkyl group having 3 to 6 carbon atoms.

In accordance with the present invention, there is also provided a lithium secondary battery comprising a cathode, an anode and an electrolyte solution containing an electrolyte dissolved in a non-aqueous solvent, said electrolyte solution contains a carbonic ester derivative having the formula (I):

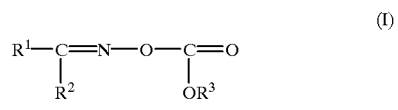

wherein $R^1$, $R^2$ and $R^3$ independently represent an alkyl group having 1 to 12 carbon atoms, a cycloalkyl group having 3 to 6 carbon atoms, or an aryl group having 6 to 12 carbon atoms, provided that $R^2$ may be a hydrogen atom and provided that $R^1$ and $R^2$ may be connected through a methylene group to form a cycloalkyl group having 3 to 6 carbon atoms.

The above compound contained in the electrolyte is considered to contribute the formation of a passivation film on the surface of the carbon material and the highly crystallized carbon material due to the activity of, for example, natural graphite and artificial graphite is coated with the passivation film, whereby the decomposition of the electrolyte can be suppressed, without adversely affecting the normal reactions of the battery.

DETAILED DESCRIPTION OF PREFERRED EMBODIMENTS

The carbonic ester derivatives contained in the electrolyte solution comprising an electrolyte dissolved in a non-aqueous solvent are preferably those having the formula (I), wherein $R^1$, $R^2$ and $R^3$ are independently an alkyl group having 1 to 12 carbon atoms such as a methyl, ethyl, propyl, butyl, pentyl or hexyl group. The alkyl group may be a branched alkyl group such as an isopropyl or isobutyl group. Further, $R^1$ and $R^2$ may be combined together through a methylene connecting group to form a cycloalkyl group having 3 to 6 carbon atoms such as a cyclopentyl or cyclohexyl group. Furthermore, $R^1$, $R^2$ and $R^3$ may be independently an aryl group having 6 to 12 carbon atoms such as a phenyl or benzyl group. $R^2$ may be a hydrogen atom.

Typical examples of the carbonic ester derivatives having the formula (I) are 2-butanoneoxime methylcarbonate (i.e., $R^1$=a methyl group, $R^2$=an ethyl group, $R^3$=a methyl group), 2-butanoneoxime ethylcarbonate (i.e., $R^1$=a methyl group, $R^2$=an ethyl group, $R^3$=an ethyl group), 2-propanoneoxime ethylcarbonate (i.e., $R^1$=a methyl group, $R^2$=a methyl group, $R^3$=an ethyl group), 2-butanoneoxime phenylcarbonate (i.e., $R^1$=a methyl group, $R^2$=an ethyl group, $R^3$=a phenyl group), 2-butanoneoxime benzylcarbonate (i.e., $R^1$=a methyl group, $R^2$=an ethyl group, $R^1$=a benzyl group), benzaldoxime methylcarbonate (i.e., $R^3$=a phenyl group, $R^2$=a hydrogen atom, $R^3$=a methyl group), acetophenoneoxime methylcarbonate (i.e., $R^1$=a phenyl group, $R^2$=a methyl group, $R^3$=a methyl group), pentanealdoxime methylcarbonate (i.e., $R^1$=a n-butyl group, $R^2$=a hydrogen atom, $R^3$=a methyl group). Further, typical examples of the carbonic ester derivatives having a $C_3$–$C_6$ cycloalkyl group formed by connecting $R^1$ and $R^2$ by a methylene group are the following cycloalkanoneoxime methylcarbonates:

Cyclopentanoneoxime methylcarbonate

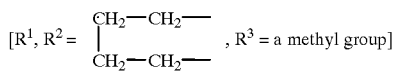

Cyclopentanoneoxime ethylcarbonate

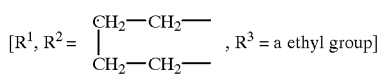

Cyclohexanoneoxime methylcarbonate

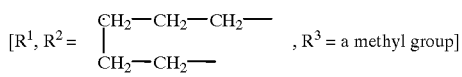

Cyclohexanoneoxime ethylcarbonate

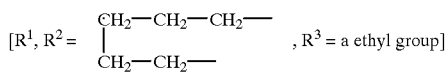

The carbonic ester derivatives in the present invention are not limited to the above examples, but any optionally selected derivatives, preferably those having $R^1$, $R^2$ and $R^3$ being independently a $C_1$–$C_{12}$ alkyl group, may be used. When the amount of the carbonic ester derivatives having the formula (I) contained in the electrolyte solution is too large, the electroconductivity, etc. of the electrolyte solution may change, and therefore, the performance of the battery is sometimes likely to decrease. On the other hand, the amount is too small, the sufficient film does not form, and therefore, the expected performance of battery cannot be obtained. Therefore, the preferable amount of the carbonic ester derivative is 0.01 to 20% by weight, more preferably 0.1 to 10% by weight, based upon the total weight of the electrolyte solution.

The carbonic ester derivatives having the formula (I) can be prepared by, for example, the following chemical reactions (1) and (2).

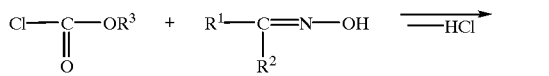

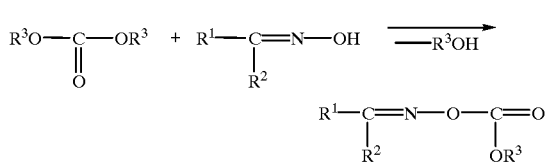

The non-aqueous solvents usable in the present invention preferably comprise mixture of high permitivity solvents and low viscosity solvents.

Examples of the high dielectric constant solvents are cyclic carbonates such as ethylene carbonate (EC), propylene carbonate (PC), butylene carbonate (BC). These high dielectric constant solvents may be used alone or in any mixture thereof.

Examples of the low viscosity solvents are linear carbonates such as dimethyl carbonate (DMC), methyl ethyl carbonate (MEC), diethyl carbonate (DEC), ethers such as tetrahydrofuran, 2-methyltetrahydrofuran, 1,4-dioxane, 1,2-dimethoxyethane, 1,2-diethoxyethane, 1,2-dibutoxyethane, lactones such as γ-butyrolactone, nitriles such as acetonitrile, esters such as methyl propionate, amides such as dimethylformamide, etc. These low viscosity solvents may be used alone or in any mixture thereof.

The high dielectric constant solvent and the low viscosity solvent may be used in any selected combinations. The preferable ratio by volume of the high dielectric constant solvent and the low viscosity solvent (i.e., the high dielectric constant solvent:the low viscosity solvent) is 1:9 to 4:1, more preferably 1:4 to 7:3.

Examples of the electrolyte usable in the present invention are $LiPF_6$, $LiBF_4$, $LiClO_4$, $LiN(SO_2CF_3)_2$, $LiN(SO_2C_2F_5)_2$, $LiC(SO_2CF_3)_3$, etc. These electrolytes may be used alone or in any mixtures thereof. These electrolytes may be used at a concentration of preferably 0.1–3M, more preferably 0.5–1.5M in the above-mentioned non-aqueous solvent in the dissolved form.

The electrolyte solution according to the present invention may be prepared by, for example, mixing the high dielectric constant solvent and the low viscosity solvent, followed by dissolving the electrolyte therein and then dissolving the carbonic ester derivative having the general formula (I) therein.

The other components or members, other than the electrolyte, constituting the secondary battery are various components conventionary used in secondary batteries.

For example, as the cathode substances (or cathode active substances), composite metal oxides of lithium with at least one metal selected from cobalt, manganese, nickel, chromium, iron and vanadium may be used. Examples of such composite metal oxides are $LiCoO_2$, $LiMn_2O_4$, $LiNiO_2$, etc.

The cathode are prepared by, for example, mixing the above cathode substance with an electroconductive material such as acetylene black, carbon black and a binder such as polytetrafluoroethylene (PTFE), polyvinylidene fluoride (PVDF) to form a cathode material, followed by coating the cathode material on a collector such as an aluminum foil, a stainless steel foil or a lath plate followed by drying and pressing and then followed by heat treating at a temperature of about 50–250° C. for about 2 hours under vacuum.

As the anode substances (or anode active substances), carbon materials having a graphite type crystal structure capable of intercalation and deintercalation of lithium (e.g., pyrotic carbons, cokes, graphites such as natural graphite, artificial graphite etc., organic high molecular substance combustion products, carbon fibers) may be used. Especially, the use of the carbon materials having a graphite type crystal structure wherein a lattice spacing ($d_{002}$) of lattice plane (002) is 3.35 to 3.40 Angstrom. The powder material such as carbon material is mixed with a binder such as ethylene propylene diene terpolymer (EPDM), polytetrafluoroethylene (PTFE), polyvinylidene fluoride (PVDF) to form an anode material for an anode.

In the present invention, the carbonic ester derivatives having the above formula (I) contained in the electrolyte are considered to contribute the formation of a passivation film on the surface of the carbon material and the highly crystallized carbon material due to the activity of, for example, natural graphite and artificial graphite is coated with the passivation film, whereby the decomposition of the electrolyte can be suppressed, without adversely affecting the normal reactions of the battery.

The structure of the lithium secondary battery is not particularly limited. A coin battery having a cathode, anode, and single or multiple layer separators, further, a cylindrical battery, prismatic battery, etc. having a cathode, anode, and roll-shaped separators may be exemplified. Note that, as a separator, a known microporous film, woven fabric, nonwoven fabric, etc. of a polyolefin is used.

EXAMPLES

The present invention will now be further explained in detail, but is by no means limited to, the following Examples and Comparative Examples. The oxime alkyl carbonates used in the following Examples were all prepared by the reaction of oxime-containing compounds and chloroformic esters.

Example 1

Preparation of Electrolyte Solution

A non-aqueous solvent having a volume ratio of propylene carbonate (PC) and dimethyl carbonate (DMC) of PC:DMC=1:2 was prepared. Thereafter, $LiPF_6$ was dissolved therein at a concentration of 1M to form an electrolyte solution, followed by adding thereto, as an additive of a carbonic ester derivative, 2-butanone oxime methyl carbonate at a concentration of 1% by weight in the electrolyte solution.

Fabrication of Lithium Secondary Battery and Measurement of Battery Characteristics 80% by weight of $LiCoO_2$ (i.e., a cathode active material), 10% by weight of acetylene black (i.e., an electroconductive material) and 10% by weight of polytetrafluoroethylene (i.e., a binder) were mixed and then added thereto 1-methyl-2-pyrrolidone solvent followed by mixing and the resultant mixture was coated on an aluminum foil, followed by drying and pressing to fabricate a cathode. 90% by weight of natural graphite (i.e., an anode active material) and 10% by weight of polyvinylidene fluoride (i.e., a binder) were mixed and then added thereto 1-methyl-2-pyrrolidone solvent followed by mixing and the resultant mixture was coated on a copper foil, followed by drying and pressing to prepare an anode. A separator of a polypropylene microporous film was used and impregnated with the above electrolyte to fabricate a coin battery having a diameter of 20 mm and a thickness of 3.2 mm.

This coin battery was used and repeatedly charged and discharged at room temperature (25° C.) by charging for 5 hours at a constant current of 0.8 mA and a constant voltage until an upper-limited voltage of 4.2V and then by discharging at a constant current of 0.8 mA until a lower-limited voltage of 2.7V. The initial charge capacity and the initial discharge capacity was approximately the same as in the case of using EC/DMC(1/1) as an electrolyte solution (see Comparative Example 1) and, when the battery characteristics after 50 cycle of the charge and discharge was determined, the retention rate of the discharge capacity was 85.4% when the initial discharge capacity was made 100%. The low temperature characteristics were also good. The manufacturing conditions and the characteristics of the coin battery are shown in Table 1.

Example 2

The coin battery was fabricated in the same manner as in Example 1, except that the addition amount of 2-butanone oxime methylcarbonate was changed to make the concentration thereof in the electrolyte solution to 0.1% by weight. The retention rate (%) of the discharge capacity after 50 cycles was 82.1%. The fabrication conditions and the characteristics of the coin battery are shown in Table 1.

Example 3

A coin battery was fabricated in the same manner as in Example 1, except that 2-butanoneoxime methylcarbonate was changed in such an amount that the concentration thereof in the electrolyte solution was 5.0% by weight. When the battery characteristics after 50 cycles were determined, the retention rate of the discharge capacity was 84.8%.

The fabrication conditions and battery characteristics of the coin battery are shown in Table 1.

Example 4

A coin battery was fabricated in the same manner as in Example 1, except that 2-propanoneoxime ethylcarbonate (i.e., $R^1$=methyl, $R^2$=methyl, and $R^3$=ethyl) was used, as a carbonic ester derivative, in such an amount that the concentration thereof in the electrolyte solution was 3.0% by weight. When the battery characteristics after 50 cycles were determined, the retention rate of the discharge capacity was 84.5%.

The fabrication conditions and battery characteristics of the coin battery are shown in Table 1.

Example 5

A coin battery was fabricated in the same manner as in Example 1, except that 2-butanoneoxime ethylcarbonate (i.e., $R^1$=methyl, $R^2$=ethyl, $R^3$=ethyl) was used, as a carbonic ester derivative, in such an amount that the concentration thereof in the electrolyte solution was 3.0% by weight. When the battery characteristics after 50 cycles were determined, the retention rate of the discharge capacity was 85.0%.

The fabrication conditions and battery characteristics of the coin battery are shown in Table 1.

Example 6

A coin battery was fabricated in the same manner as in Example 1, except that cyclopentanoneoxime ethylcarbonate (i.e.,

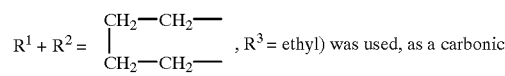

, $R^3$ = ethyl) was used, as a carbonic $R^3$=ethyl) was used, as a carbonic ester derivative, in such an amount that the concentration thereof in the electrolyte solution was 3.0% by weight. When the battery characteristics after 50 cycles were determined, the retention rate of the discharge capacity was 83.9%.

The fabrication conditions and battery characteristics of the coin battery are shown in Table 1.

TABLE 1

| Example | Cathode | Anode | Additive $R^1$ | $R^2$ | $R^3$ | Addition Amount (wt %) | Composition of Electrolyte (Vol. Ratio) | Retention Rate (%) of Discharge Capacity after 50 cycles |
|---|---|---|---|---|---|---|---|---|
| 1 | $LiCoO_2$ | Natural Graphite | $CH_3$ | $C_2H_5$ | $CH_3$ | 1.0 | 1M $LiPF_6$ PC-DMC(1/2) | 85.4 |
| 2 | $LiCoO_2$ | Natural Graphite | $CH_3$ | $C_2H_5$ | $CH_3$ | 0.1 | 1M $LiPF_6$ PC-DMC(1/2) | 82.1 |
| 3 | $LiCoO_2$ | Natural Graphite | $CH_3$ | $C_2H_5$ | $CH_3$ | 5.0 | 1M $LiPF_6$ PC-DMC(1/2) | 84.8 |
| 4 | $LiCoO_2$ | Natural Graphite | $CH_3$ | $CH_3$ | $C_2H_5$ | 3.0 | 1M $LiPF_6$ PC-DMC(1/2) | 84.5 |
| 5 | $LiCoO_2$ | Natural Graphite | $CH_3$ | $C_2H_5$ | $C_2H_5$ | 3.0 | 1M $LiPF_6$ PC-DMC(1/2) | 85.0 |
| 6 | $LiCoO_2$ | Natural Graphite | —$(CH_2)_4$— | | $CH_3$ | 3.0 | 1M $LiPF_6$ PC-DMC(1/1) | 83.9 |

Example 7

A coin battery was fabricated in the same manner as in Example 1, except that benzaldooxime methylcarbonate (i.e., $R^1$=phenyl, $R^2$=hydrogen, $R^3$=methyl) was used, as a carbonic ester derivative, in such an amount that the concentration thereof in the electrolyte solution was 1.0% by weight. When the battery characteristics after 50 cycles were detected, the retention rate of the discharge capacity was 86.3%.

The fabrication conditions and battery characteristics of the coin battery are shown in Table 2.

Examples 8–13

Coin batteries were fabricated in the same manner as in Example 1, except that the additive of Example 1 and the composition of the electrolyte solution were changed as shown in Tables 2 and 3 and the battery characteristics were determined.

The retention rates of the discharge capacity at room temperature after 50 cycles are shown in Tables 2 and 3.

TABLE 2

| Example | Cathode | Anode | Additive $R^1$ | $R^2$ | $R^3$ | Addition Amount (wt %) | Composition of Electrolyte (Vol. Ratio) | Retention Rate (%) of Discharge Capacity after 50 cycles |
|---|---|---|---|---|---|---|---|---|
| 7 | $LiCoO_2$ | Natural Graphite | Ph | H | $CH_3$ | 1.0 | 1M $LiPF_6$ PC-DMC(1/2) | 86.3 |
| 8 | $LiCoO_2$ | Natural Graphite | Ph | H | $CH_3$ | 1.0 | 1M $LiPF_6$ PC-MEC(1/2) | 86.1 |
| 9 | $LiCoO_2$ | Natural Graphite | Ph | H | $CH_3$ | 1.0 | 1M $LiPF_6$ PC-DEC(1/2) | 85.6 |
| 10 | $LiCoO_2$ | Natural Graphite | $C_4H_9$ | H | $CH_3$ | 1.0 | 1M $LiPF_6$ PC-DMC(1/2) | 83.7 |
| 11 | $LiCoO_2$ | Natural Graphite | Ph | $CH_3$ | $CH_3$ | 1.0 | 1M $LiPF_6$ PC-DMC(1/2) | 83.6 |
| 12 | $LiCoO_2$ | Natural Graphite | Ph—$C_2H_4$ | H | $CH_3$ | 1.0 | 1M $LiPF_6$ PC-DMC(1/2) | 82.9 |

Example 14

A coin battery was fabricated in the same manner as in Example 1, except that $LiMn_2O_4$ was used as a cathode active substance, instead of $LiCoO_2$. When the battery characteristics after 50 cycle were determined, the retention rate of the discharge capacity was 91.2%.

The results are shown in Table 3.

Example 15

A lithium secondary battery was fabricated in the same manner as in Example 1, except that artificial graphite (i.e., MCMB available from Osaka Gas Chemical Co.) was used as an anode active substance, instead of the natural graphite and the charging and discharging test was carried out. The retention rate of the discharge capacity at 50 cycle is shown in Table 3.

Comparative Example 1

A non-aqueous solvent having a volume ratio of ethylene carbonate (EC) and DMC of EC:DMC=1:2, followed by dissolving therein $LiPF_6$ at a 1M concentration in the electrolyte solution. No carbonic ester derivative was added thereto. A coin battery was fabricated using this electrolyte solution in the same manner as in Example 1 and the battery characteristics were determined. The retention rate of the discharge capacity after 50 cycle of the charge and discharge was 83.8% based upon the initial discharge capacity. However, since EC having a high melting point was used in the electrolyte solution, there was a problem in the low temperature characteristics. The fabrication conditions and the battery characteristics of the coin battery are shown in Table 3.

Comparative Example 2

A non-aqueous solvent having a volume ratio of PC:DMC=1:2, followed by dissolving therein $LiPF_6$ at a 1M concentration in the electrolyte solution. No carbonic ester derivative was added thereto. A coin battery was fabricated using this electrolyte solution in the same manner as in Example 1 and the battery characteristics were determined. However, in this case, PC was decomposed at the first charging step and the discharging was not carried out.

The fabrication conditions and the battery characteristics of the coin battery are shown in Table 3.

TABLE 3

| Example | Cathode | Anode | Additive $R^1$ | $R^2$ | $R^3$ | Addition Amount (wt %) | Composition of Electrolyte (Vol. Ratio) | Retention Rate (%) of Discharge Capacity after 50 cycles |
|---|---|---|---|---|---|---|---|---|
| 13 | $LiCoO_2$ | Natural Graphite | Ph | H | $CH_3$ | 1.0 | 1M $LiPF_6$ PC-EC-DMC(1/1/4) | 85.4 |
| 14 | $LiMn_2O_4$ | Natural Graphite | $CH_3$ | $C_2H_5$ | $CH_3$ | 1.0 | 1M $LiPF_6$ PC-DMC(1/2) | 91.2 |
| 15 | $LiCoO_2$ | Artificial Graphite | $CH_3$ | $C_2H_5$ | $CH_3$ | 1.0 | 1M $LiPF_6$ PC-DMC(1/2) | 83.5 |
| Comparative Example 1 | $LiCoO_2$ | Natural Graphite | None | | | 0 | 1M $LiPF_6$ EC-DMC(1/2) | 83.8 |
| Comparative Example 2 | $LiCoO_2$ | Natural Graphite | None | | | 0 | 1M $LiPF_6$ PC-DMC(1/2) | Charge and Discharge Impossible |

Examples 16–18

A coin battery was fabricated in the same manner as in Example 1, except that the type and addition amount of the additive and the composition of the electrolyte solution in Example 1 were changed as shown in Table 4 and the battery characteristics were determined.

The results are shown in Table 4.

Example 19

A coin battery was fabricated in the same manner as in Example 16, except that $LiMn_2O_4$ was used as a cathode active substance, instead of $LiCoO_2$. When the battery characteristics after 50 cycle were determined, the retention rate of the discharge capacity was 92.2%.

The results are shown in Table 4.

Example 20

A coin battery was fabricated in the same manner as in Example 17, except that artificial graphite (i.e., MCMB available from Osaka Gas Chemical Co.) was used as an anode active substance, instead of the natural graphite and that the additive was changed as shown in Table 4 and the charge and discharge test was carried out. The retention rate of the discharge capacity was 90.5%.

The results are shown in Table 4.

TABLE 4

| Example | Cathode | Anode | Additive R¹ | R² | R³ | Addition Amount (wt %) | Composition of Electrolyte (Vol. Ratio) | Retention Rate (%) of Discharge Capacity after 50 cycles |
|---|---|---|---|---|---|---|---|---|
| 16 | LiCoO$_2$ | Natural Graphite | Ph | H | CH$_3$ | 1.0 | 1M LiPF$_6$ EC-DMC(1/2) | 93.4 |
| 17 | LiCoO$_2$ | Natural Graphite | Ph | H | CH$_3$ | 3.0 | 1M LiPF$_6$ EC-DMC(1/2) | 94.2 |
| 18 | LiCoO$_2$ | Natural Graphite | Ph | H | CH$_3$ | 8.0 | 1M LiPF$_6$ EC-DMC(1/2) | 90.8 |
| 19 | LiCoO$_2$ | Natural Graphite | Ph | H | CH$_3$ | 1.0 | 1M LiPF$_6$ EC-DMC(1/2) | 92.2 |
| 20 | LiCoO$_2$ | Artificial Graphite | CH$_3$ | C$_2$H$_5$ | CH$_3$ | 3.0 | 1M LiPF$_6$ EC-DMC(1/2) | 90.5 |

It should be noted that the present invention is not limited to the Examples above and includes various combinations easily substitutable from the spirit of the present invention. Especially, the combinations of the solvents shown in above Examples by no means limit the present invention. Furthermore, although the above Examples only relate to coin batteries, the present invention can be applied to cylindrical, prismatic and other batteries.

As explained above, according to the present invention, the lithium secondary batteries having excellent battery characteristics such as the cycle characteristics of battery, the electric capacity and storage characteristics and also excellent low temperature characteristics.

What is claimed is:

1. An electrolyte solution for a lithium secondary battery comprising a non-aqueous solvent, an electrolyte and a carbonic ester derivative both dissolved therein, said carbonic ester derivative having the formula (I):

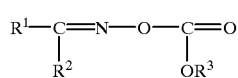

wherein R$^1$, R$^2$ and R$^3$ independently represent an alkyl group having 1 to 12 carbon atoms, a cycloalkyl group having 3 to 6 carbon atoms, or an aryl group having 6 to 12 carbon atoms, provided that R$^2$ may be a hydrogen atom and provided that R$^1$ and R$^2$ may be connected through a methylene group to form a cycloalkyl group having 3 to 6 carbon atoms.

2. The electrolyte solution for a lithium secondary battery as claimed in claim 1, wherein the content of the carbonic ester derivative is 0.01 to 20% by weight, based upon the total weight of the electrolyte solution.

3. The electrolyte solution for a lithium secondary battery as claimed in claim 1, wherein the non-aqueous solvent comprises (a) a high dielectric constant solvent and (b) a low viscosity solvent in a volume ratio of (a):(b)=1:9 to 4:1.

4. The electrolyte solution for a lithium secondary battery as claimed in claim 3, wherein the high dielectric constant solvent comprises at least one solvent selected from the group consisting of ethylene carbonate, propylene carbonate and butylene carbonate.

5. The electrolyte solution for a lithium secondary battery as claimed in claim 3, wherein the low viscosity solvent comprises at least one linear carbonate selected from the group consisting of dimethyl carbonate, diethyl carbonate and methyl ethyl carbonate.

6. The electrolyte solution for a lithium secondary battery as claimed in claim 1, wherein the electrolyte comprises at least one compound selected from the group consisting of LiPF$_6$, LiBF$_4$, LiClO$_4$, LiN(SO$_2$CF$_3$)$_2$, LiN(SO$_2$C$_2$F$_5$)$_2$ and LiC(SO$_2$CF$_3$)$_3$ in a concentration of 0.1 to 3M in the non-aqueous solvent.

7. A lithium secondary battery comprising a cathode, an anode and an electrolyte solution containing an electrolyte dissolved in a non-aqueous solvent, said electrolyte solution comprising a carbonic ester derivative having the formula (I):

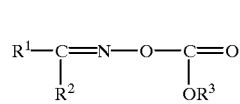

wherein R$^1$, R$^2$ and R$^3$ independently represent an alkyl group having 1 to 12 carbon atoms, a cycloalkyl group having 3 to 6 carbon atoms, or an aryl group having 6 to 12 carbon atoms, provided that R$^2$ may be a hydrogen atom and provided that R$^1$ and R$^2$ may be connected through a methylene group to form a cycloalkyl group having 3 to 6 carbon atoms wherein the anode comprises graphite.

8. The lithium secondary battery as claimed in claim 7, wherein the cathode comprises of at least one lithium complex oxide selected from the group consisting of LiCoO$_2$, LiMn$_2$O$_4$ and LiNiO$_2$.

9. The lithium secondary battery as claimed in claim 7, wherein the graphite has a lattice spacing (d$_{002}$) of lattice plane (002) of 3.35 to 3.40 Angstrom.

10. The lithium secondary battery as claimed in claim 7, wherein the anode is composed of a graphite and the content of the carbonic ester derivative is 0.01 to 20% by weight, based upon the total weight of the electrolyte solution.

11. The lithium secondary battery as claimed in claim 7, wherein the non-aqueous solvent comprises (a) a high dielectric constant solvent and (b) a low viscosity solvent in a volume ratio of (a):(b)=1:9 to 4:1.

12. The lithium secondary battery as claimed in claim 7, wherein the high dielectric constant solvent comprises at least one solvent selected from the group consisting of ethylene carbonate, propylene carbonate and butylene carbonate.

13. The lithium secondary battery as claimed in claim 12, wherein the low viscosity solvent comprises at least one linear carbonate selected from the group consisting of dimethyl carbonate, diethyl carbonate and methyl ethyl carbonate.

14. The lithium secondary battery as claimed in claim 12, wherein the electrolyte comprises at least one compound selected from the group consisting of $LiPF_6$, $LiBF_4$, $LiClO_4$, $LiN(SO_2CF_3)_2$, $LiN(SO_2C_2F_5)_2$ and $LiC(SO_2CF_3)_3$ in a concentration of 0.1 to 3M in the non-aqueous solvent.

* * * * *